United States Patent
Kumar et al.

(10) Patent No.: US 7,629,779 B2
(45) Date of Patent: Dec. 8, 2009

(54) MULTIPLE OUTPUT MULTIPLE TOPOLOGY VOLTAGE CONVERTER

(75) Inventors: Pavan Kumar, Portland, OR (US); Annabelle Pratt, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 11/524,676

(22) Filed: Sep. 21, 2006

(65) Prior Publication Data

US 2008/0084112 A1    Apr. 10, 2008

(51) Int. Cl.
*G05F 1/577* (2006.01)
(52) U.S. Cl. .................... 323/267; 323/225; 323/271
(58) Field of Classification Search ............... 323/267, 323/282, 271, 268, 225, 272, 222; 307/82, 307/12, 16, 38–41; 363/20, 21.01, 21.04, 363/21.12, 65
See application file for complete search history.

(56) References Cited

U.S. PATENT DOCUMENTS

| | | | |
|---|---|---|---|
| 4,675,797 A * | 6/1987 | Vinciarelli | 363/21.04 |
| 5,751,139 A * | 5/1998 | Jordan et al. | 323/222 |
| 5,886,508 A * | 3/1999 | Jutras | 323/267 |
| 5,923,545 A | 7/1999 | Nguyen | |
| 6,052,295 A | 4/2000 | Buchschacher | |
| 6,437,548 B2 * | 8/2002 | Aas et al. | 323/272 |
| 6,611,443 B2 | 8/2003 | Gaudreau | |
| 2006/0133121 A1 | 6/2006 | Uguen | |

* cited by examiner

*Primary Examiner*—Adolf Berhane
*Assistant Examiner*—Harry Behm
(74) *Attorney, Agent, or Firm*—Kevin A. Reif

(57) ABSTRACT

In some embodiments, a three-switch dual output buck converter includes a converter circuit having N+1 switch circuits, the converter circuit being configured to receive an input voltage and to provide N output voltages, where N is two or more, and a control circuit to selectively provide control signals to the N+1 switch circuits at time intervals in accordance with the N output voltages, wherein the N output voltages include at least two different types of outputs. Other embodiments are disclosed and claimed.

17 Claims, 9 Drawing Sheets

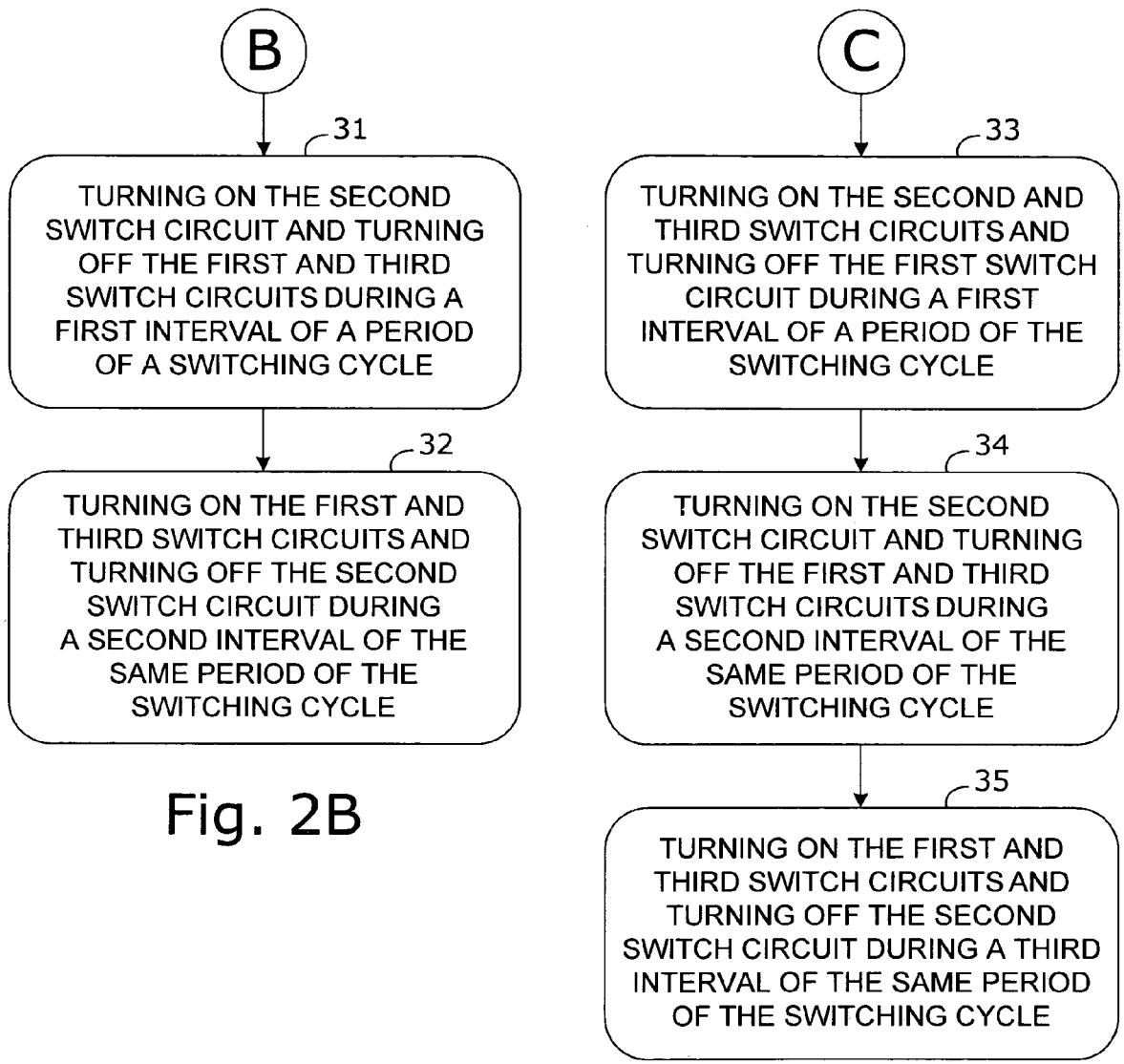

MULTIPLE OUTPUT MULTIPLE TOPOLOGY VOLTAGE CONVERTER

The invention relates to voltage converters and more particularly to an N+1 switch N output voltage converter, where N is two or more and where the N outputs include at least two different types of outputs.

BACKGROUND AND RELATED ART

Voltage converters are well known in the art. U.S. Pat. Nos. 6,747,855, 6,639,391, and 6,611,435 each describe various electronic systems utilizing voltage regulators.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
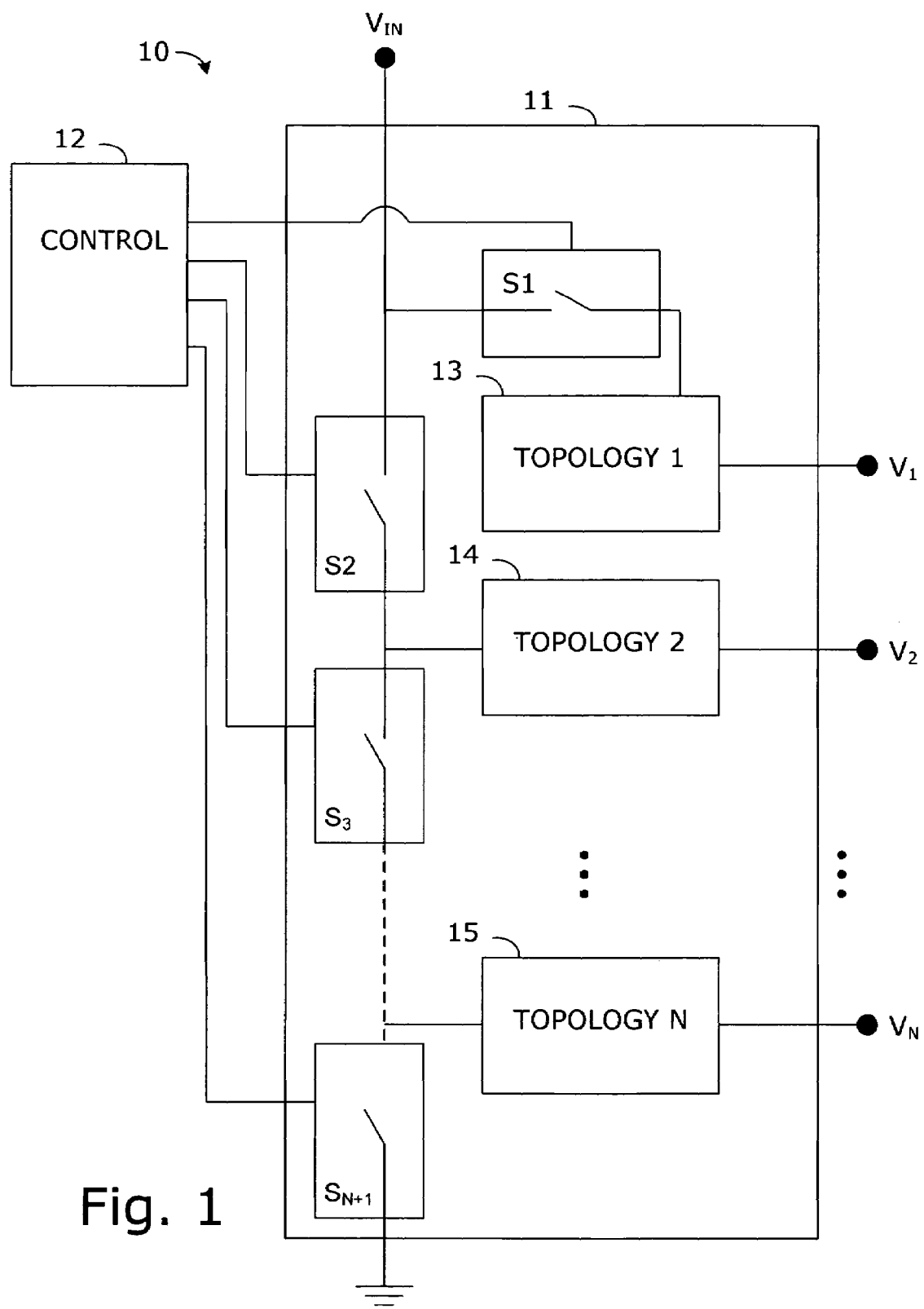
FIG. 1 is a block diagram of a multiple output, multiple topology voltage converter in accordance with some embodiments of the invention.

With reference to FIG. 1, a voltage converter 10 may include a converter circuit 11 which may have N+1 switch circuits S1 through $S_{N+1}$. The converter circuit 11 may be configured to receive an input voltage $V_{IN}$ and may provide N output voltages $V_1$ through $V_N$, where N is two or more, and a control circuit 12 to selectively provide control signals to the N+1 switch circuits S1 through $S_{N+1}$ at time intervals in accordance with the N output voltages $V_1$ through $V_N$, where wherein the N output voltages include at least two different types of outputs. As used herein, a different type of output refers to an output from a different class of voltage converter, and not simply a different magnitude of output voltage.

For example, the switch circuits S1 through $S_{N+1}$ may be coupled to respective voltage converter topologies 1 through N, where at least one topology is different from at least one other topology. For example, Topology 1 may include a boost converter topology and Topology 2 may include a buck converter topology such that at least one of the N output voltages includes a boost output and at least one of the N output voltages includes a buck output. Those skilled in the art will appreciate that a variety of switch and topology configurations are within the scope and spirit of the invention. For example, the switches may be re-configured such that Topology 1 may include a buck-boost converter topology and Topology 2 may include a buck converter topology such that at least one of the N output voltages includes a buck-boost output and at least one of the N output voltages includes a buck output. Given the teachings of the present specifications, other configurations and topologies may readily be implemented by those skilled in the art.

In general, each successive output voltage may be equal to or less than the prior output voltage (e.g. $V_1 \geq V_2 \geq \ldots V_N$) For example, two switch circuits (e.g. S1 and S2) may be utilized to produce a first output voltage (e.g. $V_1$) of the N output voltages and only one additional switch circuit (e.g. S3 through $S_{N+1}$) may be provided for each additional output voltage (e.g. $V_2$ through $V_N$) of the N output voltages. The voltage converter 10 may be considered to have a cascaded converter topology that utilizes semiconductor switches in an improved manner such that the number of switches may be reduced.

In some embodiments, a first switch circuit S1 may be coupled to the input voltage $V_{IN}$. A first voltage converter circuit 13 may be coupled to the first switch circuit S1, where the first voltage converter circuit is configured to provide a first type of output voltage $V_1$. At least a second switch circuit S2 and a third switch circuit S3 may be coupled in series between the input voltage and the ground potential. Another converter circuit 14 (e.g. an LC circuit) may be coupled to a junction of the second and third switch circuits S2 and S3, where the converter circuit 14 is configured to provide a second type of output voltage, different from the first type of output voltage. Additional converter circuit(s) 15 may be coupled at the junction(s) of each successive switch circuit through switch $S_{N+1}$.

For example, the control circuit 12 may be configured, in a two interval mode, to turn on the second switch circuit S2 and turn off the first and third switch circuits S1, S3 during a first interval of a period of a switching cycle; and to turn on the first and third switch circuits S1, S3 and turn off the second switch circuit S2 during a second interval of the same period of the switching cycle. Alternatively, the control circuit 12 may be configured, in a three interval mode, to turn on the second and third switch circuits S2, S3 and turn off the first switch circuit S1 during a first interval of a period of the switching cycle; to turn on the second switch circuit S2 and turn off the first and third switch circuits S1, S3 during a second interval of the same period of the switching cycle; and to turn on the first and third switch circuits S1, S3 and turn off the second switch circuit S2 during a third interval of the same period of the switching cycle. More intervals and switch configurations may be utilized during the switching interval to provide all of the needed output voltages for each cascaded stage.

Of course, various embodiments of the present invention may or may not be better suited for various power applications. Some embodiments of the voltage converter of the present invention may be particularly well suited to power the many general purpose low power rails on a PC platform. For example, one or more N+1 switch, N output, multiple topology converters, according to some embodiments of the invention, may replace the many low power linear regulators seen on a computing platform.

Figure 2A:
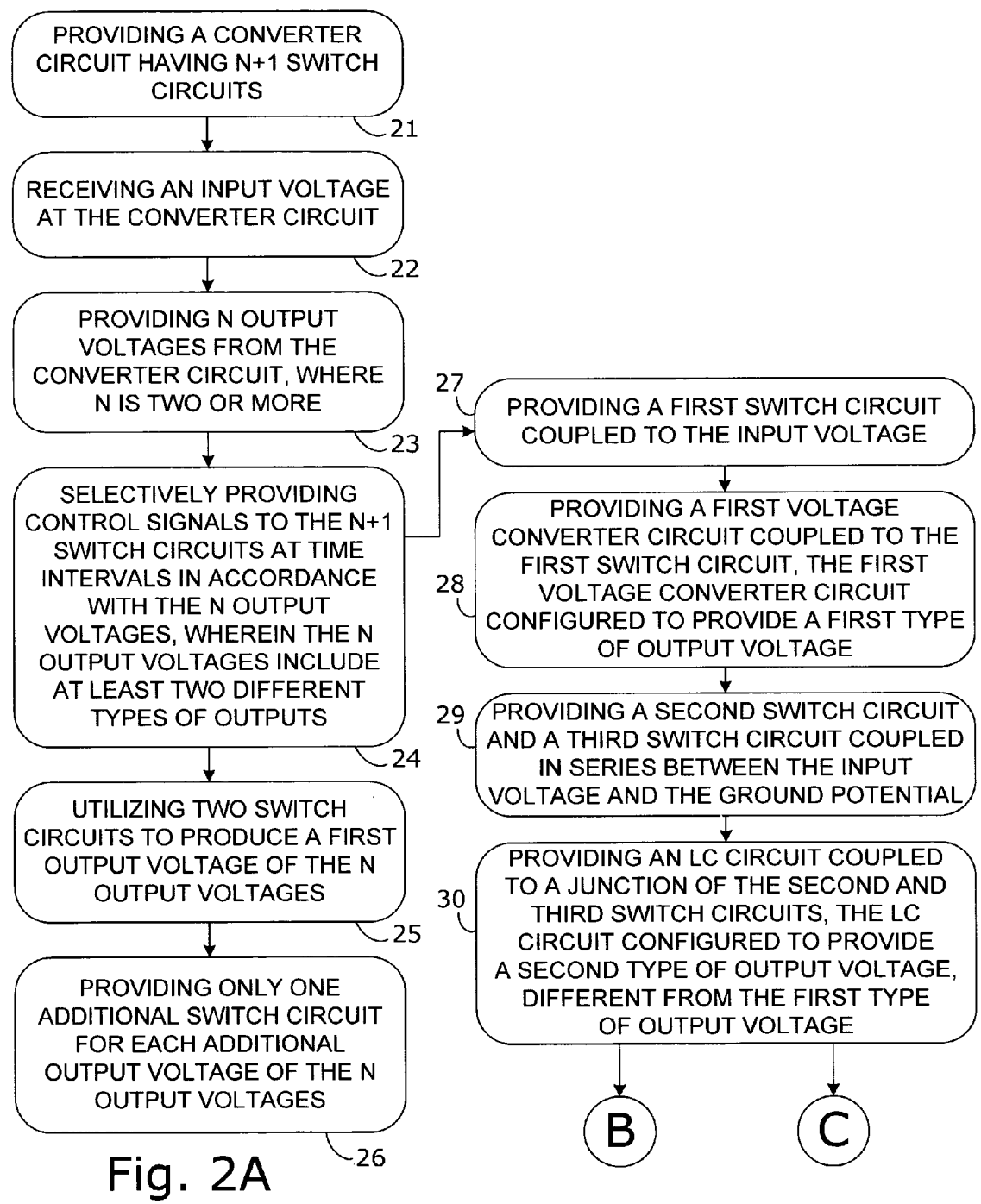
FIG. 2 is a flow diagram in accordance with some embodiments of the invention.

With reference to FIG. 2, some embodiments of the invention may involve providing a converter circuit having N+1 switch circuits (e.g. at block 21); receiving an input voltage at the converter circuit (e.g. at block 22); providing N output voltages from the converter circuit, where N is two or more (e.g. at block 23); and selectively providing control signals to the N+1 switch circuits at time intervals in accordance with the N output voltages, wherein the N output voltages include at least two different types of outputs (e.g. at block 24). In some embodiments, at least one of the N output voltages may include a boost output and at least one of the N output voltages may include a buck output. In some embodiments, at least one of the N output voltages includes a buck-boost output and at least one of the N output voltages includes a buck output.

For example, some embodiments may further involve utilizing two switch circuits to produce a first output voltage of the N output voltages (e.g. at block 25); and providing only one additional switch circuit for each additional output voltage of the N output voltages (e.g. at block 26). In some embodiments, providing the converter circuit may include providing a first switch circuit coupled to the input voltage (e.g. at block 27); providing a first voltage converter circuit coupled to the first switch circuit, the first voltage converter circuit configured to provide a first type of output voltage (e.g. at block 28); providing a second switch circuit and a third switch circuit coupled in series between the input voltage and the ground potential (e.g. at block 29); and providing an LC circuit coupled to a junction of the second and third switch circuits, the LC circuit configured to provide a second type of output voltage, different from the first type of output voltage (e.g. at block 30).

For example, some embodiments may further involve turning on the second switch circuit and turning off the first and third switch circuits during a first interval of a period of a switching cycle (e.g. at block 31); and turning on the first and third switch circuits and turning off the second switch circuit during a second interval of the same period of the switching cycle (e.g. at block 32). Alternatively, some embodiments may further involve turning on the second and third switch circuits and turning off the first switch circuit during a first interval of a period of the switching cycle (e.g. at block 33); turning on the second switch circuit and turning off the first and third switch circuits during a second interval of the same period of the switching cycle (e.g. at block 34; and turning on the first and third switch circuits and turning off the second switch circuit during a third interval of the same period of the switching cycle (e.g. at block 35).

In general terms, some embodiments of the invention may provide a class of three-switch dual-output topologies to generate two or more outputs with a reduced number of semiconductor switching devices (e.g. MOSFETs). For example, some embodiments of the invention may provide a method to generate more voltage rails with less number of components in a voltage regulator. Some embodiments of the invention may provide a general class of stacked converter topologies that utilize semiconductor switches in an improved or optimal manner such that the number of switches can be reduced. Advantageously, some embodiments of the invention may provide a direct benefit in reducing board space, lowering cost to implement multiple voltages and improving power conversion efficiency on a platform.

This application is related to U.S. patent application Ser. No. 11/158,576, filed Jun. 21, 2005, entitled MULTIPLE OUTPUT BUCK CONVERTER. The related application describes a three-switch dual-output buck converter which can provide two or more output voltages having different magnitudes, but all of which are the same type (e.g. all provided from a buck converter topology). Advantageously, some embodiments of the present invention provide a multiple output, multiple topology voltage converter, where the multiple output voltages include at least two different types of outputs (e.g. from at least two different types of voltage converter topologies).

Figure 3:
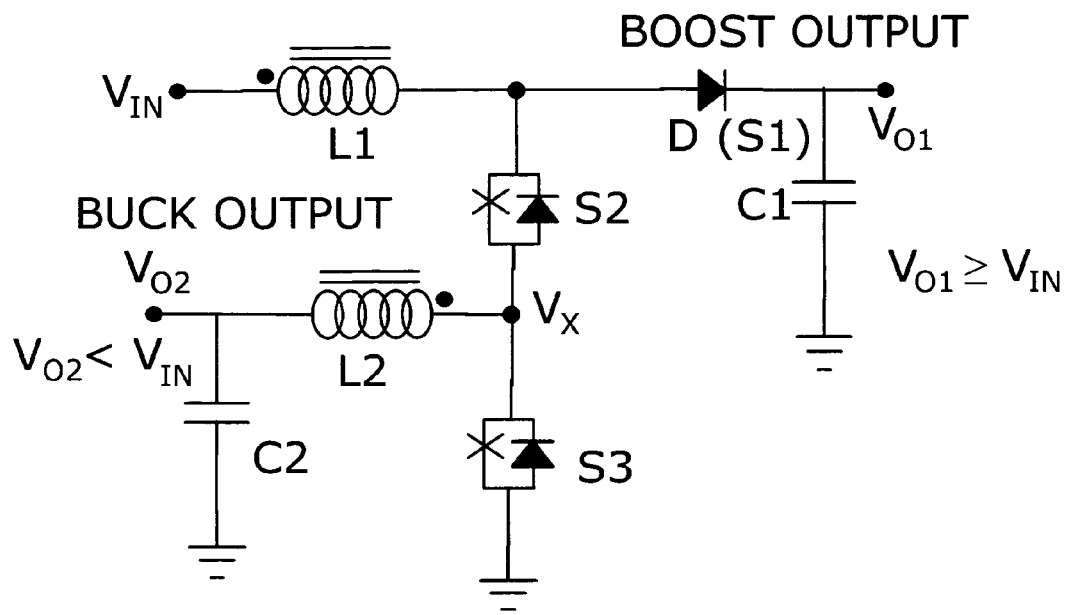
FIG. 3 is a schematic diagram of a multiple output, multiple topology voltage converter in accordance with some embodiments of the invention.

With reference to FIG. 3, some embodiments of the invention may provide a three-switch topology having dual-output voltages with a reduced number of semiconductor switches (e.g. FETs). Given that there may be multiple voltages on a PC platform which are not the same in magnitude, some embodiments of the invention advantageously provides a convenient and cost effective manner to achieve two or more voltages with reduced number of semiconductor switches. In FIG. 3, two distinct voltage rails are generated by using only three semiconductor switches. Switches S2 and S3 in conjunction with diode D (switch S1) form the network that selectively apply the input potential $V_{IN}$ and the ground potential at specific time intervals to generate the two outputs.

Figure 4:
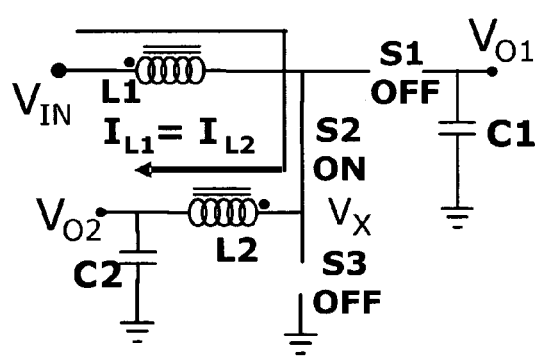
FIG. 4 is a current flow diagram in accordance with some embodiments of the present invention.
Figure 5:
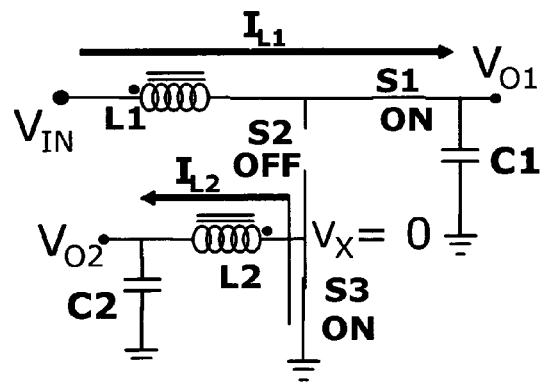
FIG. 5 is another current flow diagram in accordance with some embodiments of the present invention.

For example, the multiple output, multiple topology voltage converter of FIG. 3 may have two distinct modes of operation depending on the drive signals. FIGS. 4 and 5 show the equivalent circuits of the converter when the converter is operating in a two interval mode. In this mode the circuit has two distinct intervals. During a first interval of the cycle, switch S2 is turned ON where as the diode D (switch S1) is naturally reverse biased (OFF) and switch S3 is turned OFF. In a second interval of the same cycle (e.g. the other half of the cycle), switch S2 is OFF, whereas S3 is ON and the diode D (switch S1) is forward biased (ON).

The buck operation corresponding to output $V_{O2}$ is due to the fact that the intermediate node voltage $V_X$ (which is a function of the difference between $V_{IN}$ and $V_{O2}$ and the values of L1 & L2) is always lower than $V_{IN}$. For example, VX may be expressed as:

$$V_X = (V_{IN} \times L_2 + V_{O2} \times L_1)/(L_1 + L_2)$$

Figure 6:
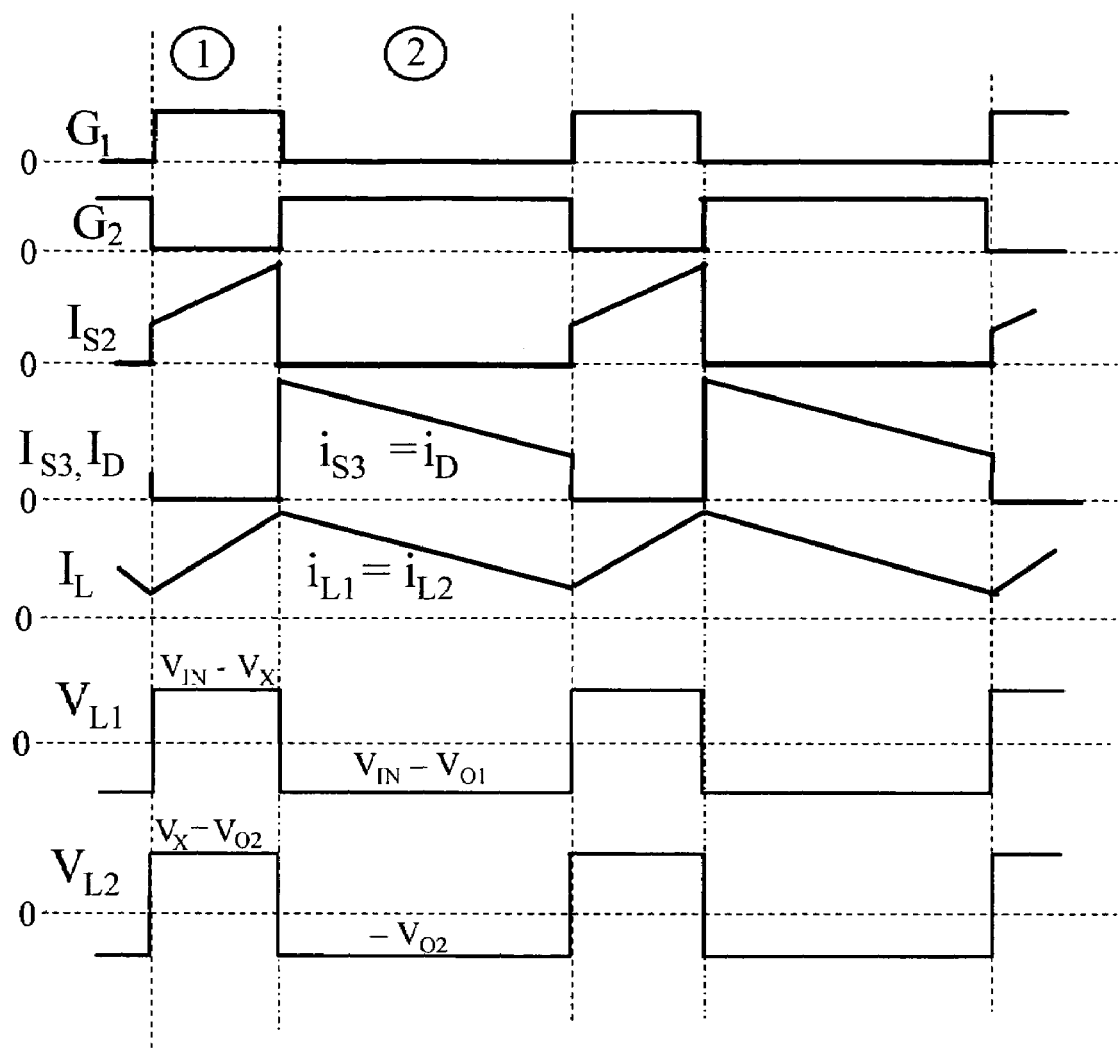
FIG. 6 is a signal chart in accordance with some embodiments of the present invention.

Example waveforms corresponding to the two interval mode are shown in FIG. 6. It is to be noted that in some embodiments only one semiconductor switch (e.g. S2 or S3) operates under all intervals. Advantageously, this may result in reduced losses and hence the efficiency of the power converter can be high.

Figure 7:
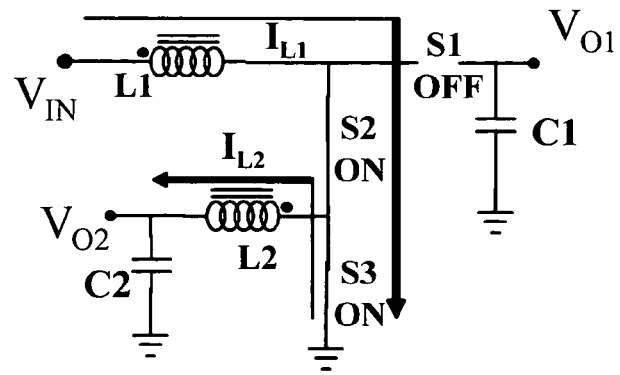
FIG. 7 is another current flow diagram in accordance with some embodiments of the present invention.
Figure 8:
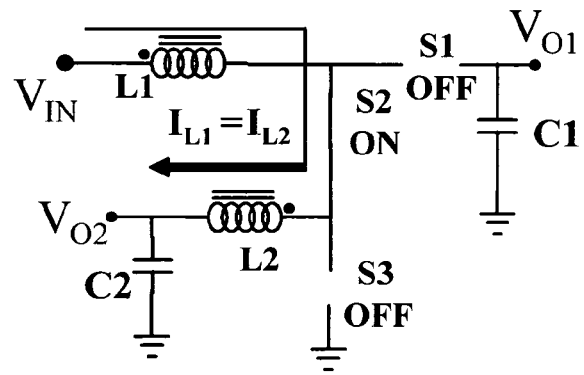
FIG. 8 is another current flow diagram in accordance with some embodiments of the present invention.
Figure 9:
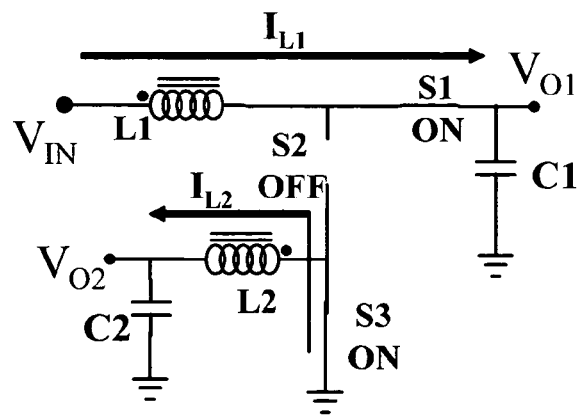
FIG. 9 is another current flow diagram in accordance with some embodiments of the present invention.
Figure 10:
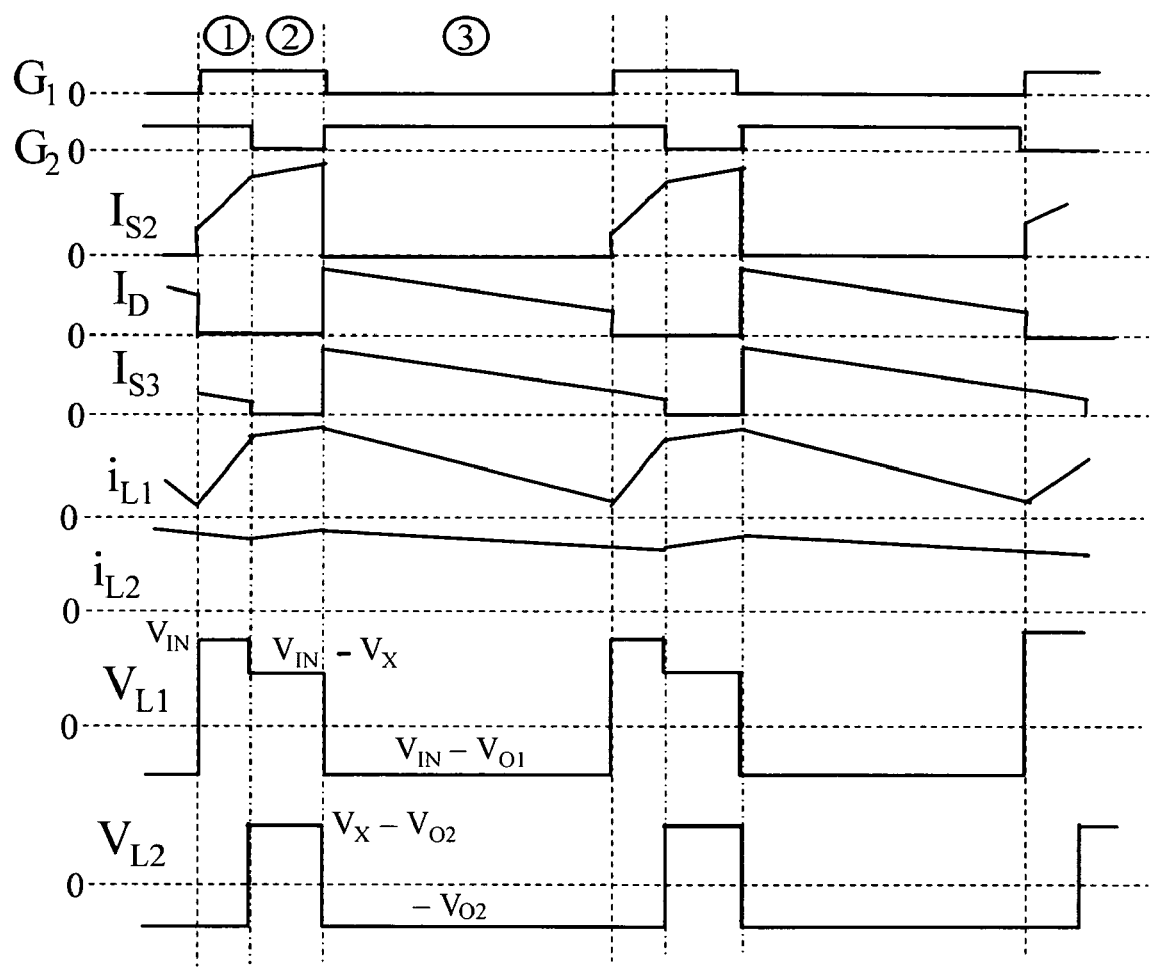
FIG. 10 is a signal chart in accordance with some embodiments of the present invention.

With reference to FIGS. 7-9, the multiple output, multiple topology voltage converter of FIG. 3 may also be operated in an alternate manner, namely a three interval mode. In the three interval mode, initially at the beginning of the cycle, both switches S2 and S3 are turned ON. The diode D (switch S1) is reverse biased (OFF) and does not conduct. The current in S3 is bidirectional because the inductor current L2 is reducing through S3 whereas the inductor current L1 (which is also flowing through S2) is rising through S3. Depending on the magnitudes of L1 & L2 the current through S3 can either be positive or negative. At the end of the first interval, the switch S3 is turned OFF and then the other two intervals are similar to the two interval mode described above. The magnitude of the output voltages is again dependent on the duty cycle of switch S2, OFF time of S3 and the magnitude of the inductor L1 and L2. Example waveforms corresponding to the three interval mode of operation are shown in FIG. 10.

It is to be noted that in this scheme, the voltages across the two inductors are not similar. The current wave shape in switch S2 is also different as compared to the two interval mode because the inductor current rise times when switch S2 is operating is different. The ON time of switches S2 and S3 can be adjusted to obtain different magnitudes of the output voltages. Advantageously, because there are only two active switches, a single driver can be used to drive the entire circuit as opposed to two drivers necessary for two distinct converters. It is also noted that the duty cycle of only one switch (either S2 or S3) needs to be controlled to regulate both the output voltages.

Figure 11:
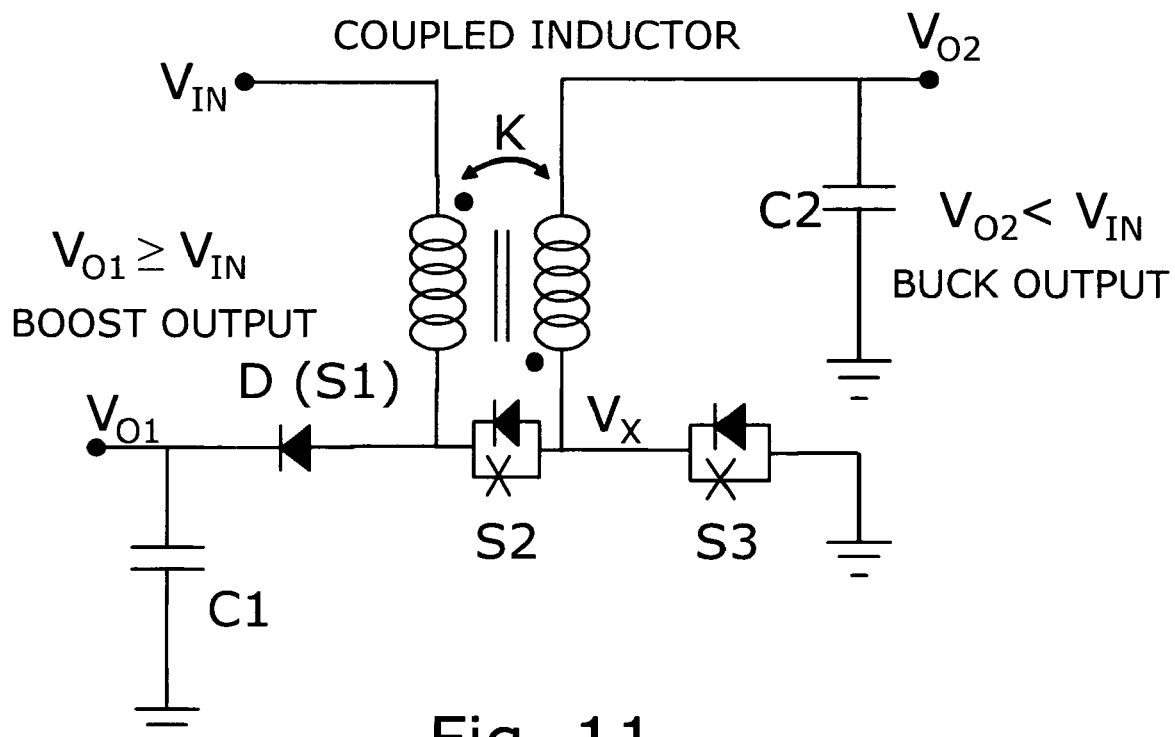
FIG. 11 is a schematic diagram of another multiple output, multiple topology voltage converter in accordance with some embodiments of the invention.

In the two interval mode, the voltage wave shapes across the two inductors L1 & L2 are similar. This fact can be used to couple the two inductors such that a single inductor can be used. With reference to FIG. 11, some embodiments of the invention may include a three switch dual output boost and buck converter, utilizing a coupled inductor. The coupled inductor circuit may be based on the similarity of inductor voltage waveforms and may only be operated in the two interval mode (e.g. the three interval mode cannot be used because the voltage waveforms across the inductors may not be sufficiently similar). Advantageously, the use of the coupled inductor may result in reduced components thus saving platform space and cost. The waveforms of the multiple output, multiple topology converter when used with a coupled inductor may be similar to that shown in FIG. 6, with some small variations.

Figure 12:
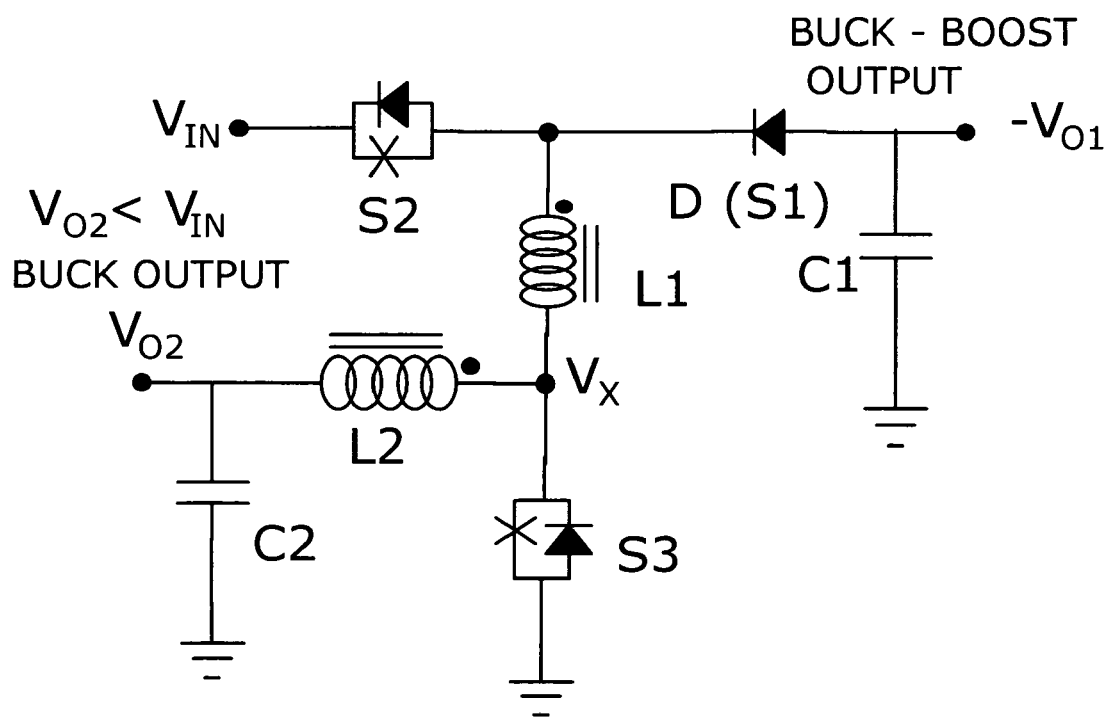
FIG. 12 is a schematic diagram of another multiple output, multiple topology voltage converter in accordance with some embodiments of the invention.

With reference to FIG. 12, the duality principle my also be applied to the above circuits and some embodiments of the invention may provide a three switch dual output converter with one buck output and one synthesized buck-boost output. Advantageously, the two different types of outputs are obtained with three switches.

Figure 13:
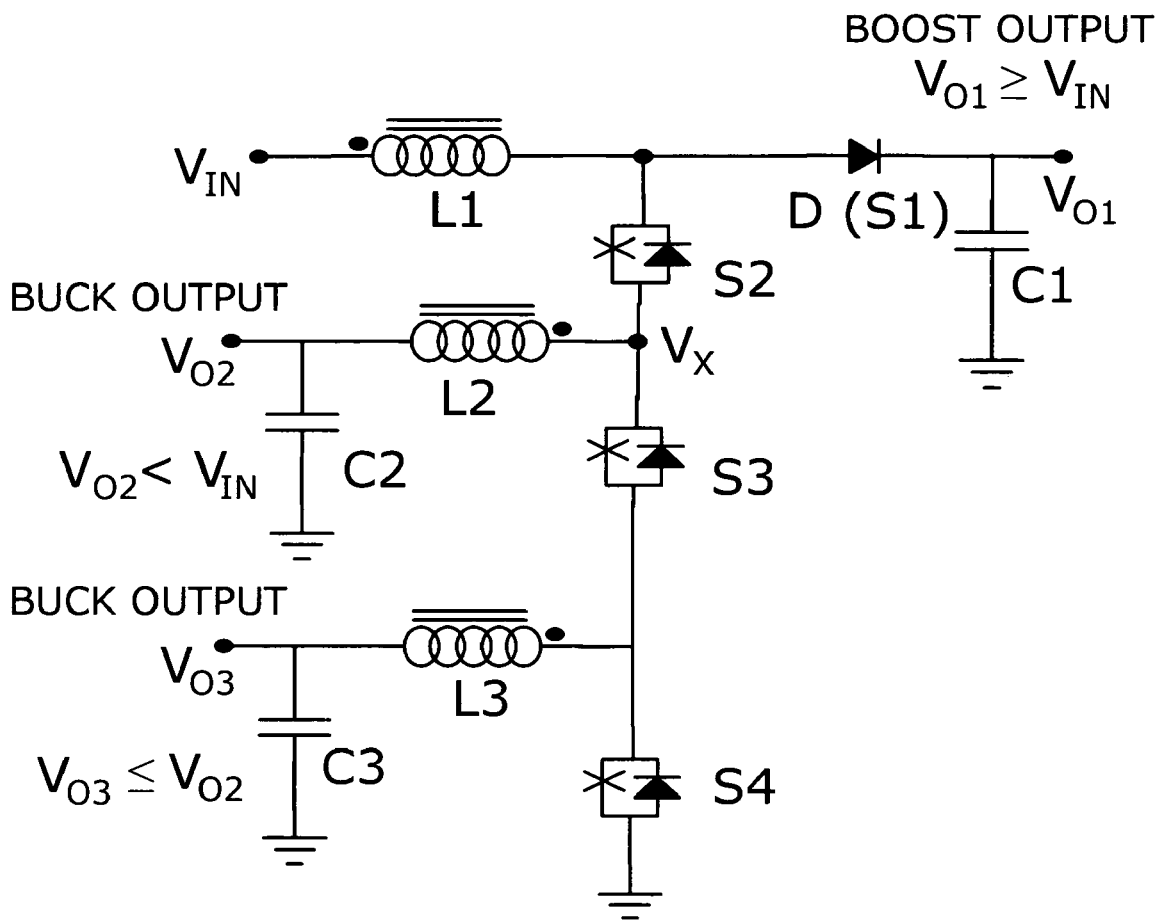
FIG. 13 is a schematic diagram of another multiple output, multiple topology voltage converter in accordance with some embodiments of the invention.

Those skilled in the art will appreciate that the few specific embodiments described herein are only examples of a multitude of circuits using a reduced number of switching elements to derive more number of outputs. Given the benefit of the present specification, other embodiments of the invention may be extended to achieve a higher number of outputs. With reference to FIG. 13, an example multiple output, multiple topology voltage converter circuit includes two buck outputs and one boost output using three semiconductor switches and a diode (four switches total). The duality principle may be applied and another set of dual output circuits can be synthesized with just three switches. The principle of the "N" outputs with "N+1" switches can be used for buck, boost, buck-boost and other common topologies.

Figure 14:
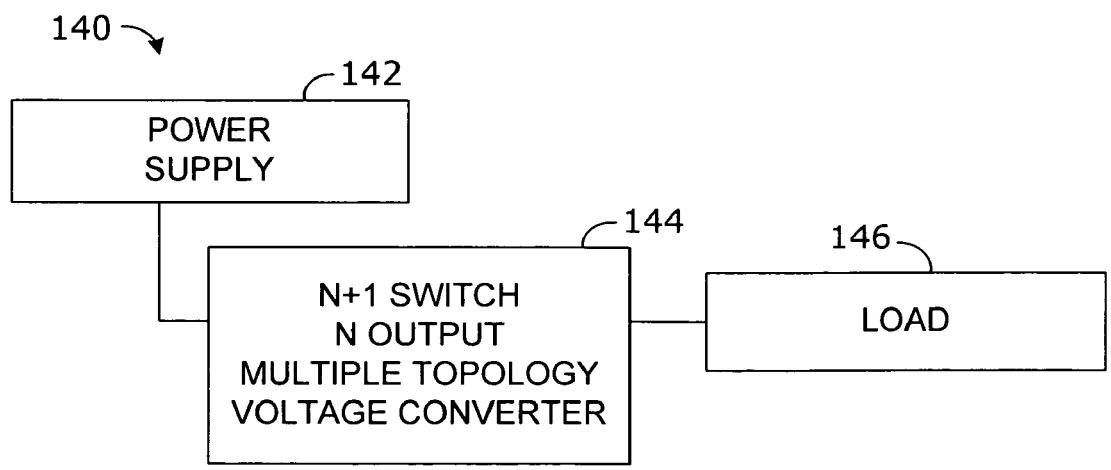
FIG. 14 is a block diagram of a system in accordance with some embodiments of the present invention.

Various embodiments of the invention may have one or more of the following advantages over existing multiple output voltage converters:

a compact converter as compared to two or more distinct converters;

powering multiple devices in reduced amount of area on a platform;

an inexpensive solution for powering multiple devices on a platform;

improved overall efficiency of the converter because average load on the converter from both the outputs can be maintained (both outputs in general are not at high output states at the same time);

reduce or minimize the control and drive requirements of the converter, making it more compact and less expensive With reference to FIG. 14, an electronic system 140 includes a power supply 142 providing power to an N+1 switch N output buck converter 144 (e.g. a three switch dual output buck and boost converter), where N is two or more. For example, the power supply may include an AC/DC adapter or a battery configured to provide the input voltage to the converter 144. The output of the converter 144 may be provided to a load 146, which may utilize two different types of output voltages from the converter 144. For example, the load may include one or more integrated circuits (e.g. a processor and a memory).

The converter 144 may have one or more of the features described above in connection with FIGS. 1-13. For example, the converter 144 may include a converter circuit having N+1 switch circuits, the converter circuit being configured to receive an input voltage and to provide N output voltages, where N is two or more, and a control circuit to selectively provide control signals to the N+1 switch circuits at time intervals in accordance with the N output voltages, wherein one of the N output voltages is provided to the integrated circuit, and where the N output voltages include at least two different types of outputs.

In some embodiments of the system 140, two switch circuits may be utilized to produce a first output voltage of the N output voltages and only one additional switch circuit may be provided for each additional output voltage of the N output voltages. For example, for a three switch dual output converter, the converter circuit may include a first switch circuit coupled to the input voltage and a first voltage converter circuit coupled to the first switch circuit, the first voltage converter circuit configured to provide a first type of output voltage. The converter may further include a second switch circuit and a third switch circuit coupled in series between the input voltage and the ground potential, and an LC circuit coupled to a junction of the second and third switch circuits, where the LC circuit is configured to provide a second type of output voltage, different from the first type of output voltage.

In some embodiments of the system 140, the control circuit may be configured to turn on the second switch circuit and turn off the first and third switch circuits during a first interval of a period of a switching cycle; and to turn on the first and third switch circuits and turn off the second switch circuit during a second interval of the same period of the switching cycle. Alternatively, in some embodiments of the system 140, the control circuit may be configured to turn on the second and third switch circuits and turn off the first switch circuit during a first interval of a period of the switching cycle; to turn on the second switch circuit and turn off the first and third switch circuits during a second interval of the same period of the switching cycle; and to turn on the first and third switch circuits and turn off the second switch circuit during a third interval of the same period of the switching cycle.

Those skilled in the art will appreciate that many different hardware and/or software arrangements may be configured to provide appropriate control signals to the switching elements. For example, a processor or a micro-controller may readily be programmed to output waveforms with appropriate timing relationships. Alternatively, a discrete hardware circuit may be configured with various time constants to provide the control signals with appropriate timing relationships.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. An apparatus, comprising:
   a converter circuit having N+1 switch circuits, the converter circuit being configured to receive an input voltage and to provide N output voltages, where N is three or more; and
   a control circuit to selectively provide control signals to the N+1 switch circuits at time intervals in accordance with the N output voltages,
   wherein the N output voltages include at least two different types of outputs,
   wherein two switch circuits are utilized to produce a first output voltage of the N output voltages and wherein only one additional switch circuit is provided for each additional output voltage of the N output voltages, wherein the converter circuit comprises:
   a first switch circuit coupled to the input voltage;
   a first voltage converter circuit coupled to the first switch circuit, the first voltage converter circuit configured to provide a first type of output voltage;
   a second switch circuit and a third switch circuit coupled in series between the input voltage and the ground potential; and
   an LC circuit coupled to a junction of the second and third switch circuits, the LC circuit configured to provide a second type of output voltage, different from the first type of output voltage.

2. The apparatus of claim 1, wherein at least one of the N output voltages includes a boost output and at least one of the N output voltages includes a buck output.

3. The apparatus of claim 1, wherein at least one of the N output voltages includes a buck-boost output and at least one of the N output voltages includes a buck output.

4. The apparatus of claim 1, wherein the control circuit is configured to turn on the second switch circuit and turn off the first and third switch circuits during a first interval of a period of a switching cycle; and
   to turn on the first and third switch circuits and turn off the second switch circuit during a second interval of the same period of the switching cycle.

5. The apparatus of claim 1, wherein the control circuit is configured to turn on the second and third switch circuits and turn off the first switch circuit during a first interval of a period of the switching cycle;
   to turn on the second switch circuit and turn off the first and third switch circuits during a second interval of the same period of the switching cycle; and
   to turn on the first and third switch circuits and turn off the second switch circuit during a third interval of the same period of the switching cycle.

6. A method, comprising:
   providing a converter circuit having N+1 switch circuits;
   receiving an input voltage at the converter circuit;
   providing N output voltages from the converter circuit, where N is three or more; and
   selectively providing control signals to the N+1 switch circuits at time intervals in accordance with the N output voltages,
   wherein the N output voltages include at least two different types of outputs,
   utilizing two switch circuits to produce a first output voltage of the N output voltages; and
   providing only one additional switch circuit for each additional output voltage of the N output voltages, wherein providing the converter circuit comprises:
   providing a first switch circuit coupled to the input voltage:
   providing a first voltage converter circuit coupled to the first switch circuit, the first voltage converter circuit configured to provide a first type of output voltage;
   providing a second switch circuit and a third switch circuit coupled in series between the input voltage and the around potential; and
   providing an LC circuit coupled to a junction of the second and third switch circuits, the LC circuit configured to provide a second type of output voltage, different from the first type of output voltage.

7. The method of claim 6, wherein at least one of the N output voltages includes a boost output and at least one of the N output voltages includes a buck output.

8. The method of claim 6, wherein at least one of the N output voltages includes a buck-boost output and at least one of the N output voltages includes a buck output.

9. The method of claim 6 further comprising:
   turning on the second switch circuit and turning off the first and third switch circuits during a first interval of a period of a switching cycle; and
   turning on the first and third switch circuits and turning off the second switch circuit during a second interval of the same period of the switching cycle.

10. The method of claim 6 further comprising:
    turning on the second and third switch circuits and turning off the first switch circuit during a first interval of a period of the switching cycle;
    turning on the second switch circuit and turning off the first and third switch circuits during a second interval of the same period of the switching cycle; and
    turning on the first and third switch circuits and turning off the second switch circuit during a third interval of the same period of the switching cycle.

11. A system, comprising:
    an integrated circuit;
    a converter circuit having N+1 switch circuits, the converter circuit being configured to receive an input voltage and to provide N output voltages, where N is three or more; and
    a control circuit to selectively provide control signals to the N+1 switch circuits at time intervals in accordance with the N output voltages,
    wherein one of the N output voltages is provided to the integrated circuit,
    and wherein the N output voltages include at least two different types of outputs,
    wherein two switch circuits are utilized to produce a first output voltage of the N output voltages and wherein only one additional switch circuit is provided for each additional output voltage of the N output voltages, wherein the converter circuit comprises:
    a first switch circuit coupled to the input voltage;

a first voltage converter circuit coupled to the first switch circuit, the first voltage converter circuit configured to provide a first type of output voltage;

a second switch circuit and a third switch circuit coupled in series between the input voltage and the ground potential; and an LC circuit coupled to a junction of the second and third switch circuits, the LC circuit configured to provide a second type of output voltage, different from the first type of output voltage.

12. The system of claim 11, wherein at least one of the N output voltages includes a boost output and at least one of the N output voltages includes a buck output.

13. The system of claim 11, wherein at least one of the N output voltages includes a buck-boost output and at least one of the N output voltages includes a buck output.

14. The system of claim 11 wherein the control circuit is configured to turn on the second switch circuit and turn off the first and third switch circuits during a first interval of a period of a switching cycle; and to turn on the first and third switch circuits and turn off the second switch circuit during a second interval of the same period of the switching cycle.

15. The system of claim 11 wherein the control circuit is configured to turn on the second and third switch circuits and turn off the first switch circuit during a first interval of a period of the switching cycle;

to turn on the second switch circuit and turn off the first and third switch circuits during a second interval of the same period of the switching cycle; and to turn on the first and third switch circuits and turn off the second switch circuit during a third interval of the same period of the switching cycle.

16. The system of claim 11, wherein the integrated circuit comprises a processor.

17. The system of claim 11, further comprising:

a battery configured to provide the input voltage to the converter circuit.

* * * * *